(12) United States Patent
Kwak et al.

(10) Patent No.: US 11,089,651 B2
(45) Date of Patent: Aug. 10, 2021

(54) SYSTEMS AND METHODS FOR PHYSICAL RANDOM ACCESS CHANNEL TRANSMISSIONS

(71) Applicant: Apple Inc., Cupertino, CA (US)

(72) Inventors: Yongjun Kwak, Portland, OR (US); Dae Won Lee, Portland, OR (US); Gregory V. Morozov, Nlzhny Novgorod (RU); Seunghee Han, San Jose, CA (US); Hong He, Sunnyvale, CA (US); Candy Yiu, Portland, OR (US); Kyeongin Jeong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/376,333

(22) Filed: Apr. 5, 2019

(65) Prior Publication Data
US 2019/0239283 A1 Aug. 1, 2019

Related U.S. Application Data

(60) Provisional application No. 62/654,006, filed on Apr. 6, 2018, provisional application No. 62/670,338, filed on May 11, 2018.

(51) Int. Cl.
*H04W 88/02* (2009.01)
*H04W 74/08* (2009.01)
(Continued)

(52) U.S. Cl.
CPC ......... *H04W 88/023* (2013.01); *H04L 1/0026* (2013.01); *H04L 1/1819* (2013.01); *H04L 5/0055* (2013.01); *H04W 52/00* (2013.01); *H04W 56/001* (2013.01); *H04W 56/005* (2013.01); *H04W 72/0413* (2013.01);
(Continued)

(58) Field of Classification Search
CPC ............ H04W 74/0833; H04W 74/04; H04W 84/045; H04W 52/50; H04W 52/146; H04W 76/15; H04W 74/08; H04W 52/34; H04W 52/244; H04W 72/042; H04W 72/14; H04W 76/27; H04W 74/006; H04W 88/02; H04W 88/08
See application file for complete search history.

(56) References Cited

U.S. PATENT DOCUMENTS 10,645,730 B2 * 5/2020 Cao ........................ H04W 76/27
2015/0208404 A1 * 7/2015 Yie ........................ H04W 76/15
370/329

(Continued)

*Primary Examiner* — Jung Liu
(74) *Attorney, Agent, or Firm* — Eschweiler & Potashnik, LLC

(57) ABSTRACT

An apparatus is configured for a user equipment (UE) device. The apparatus comprises baseband circuitry and/or application circuitry which includes a radio frequency (RF) interface and one or more processors. The one or more processors are configured to generate a physical random access channel (PRACH) within a slot at a medium access control (MAC) layer, generate a scheduling request (SR) within the slot at the MAC layer, determine a PRACH prioritization and an SR prioritization at a physical layer according to a prioritization rule; and provide the PRACH and the SR to the RF interface for transmission according to the prioritization rule.

14 Claims, 9 Drawing Sheets

(51) Int. Cl.
*H04W 72/12* (2009.01)
*H04W 72/04* (2009.01)
*H04L 5/00* (2006.01)
*H04L 1/00* (2006.01)
*H04W 56/00* (2009.01)
*H04W 76/27* (2018.01)
*H04L 1/18* (2006.01)
*H04W 80/02* (2009.01)
*H04W 52/00* (2009.01)

(52) U.S. Cl.
CPC ... *H04W 72/0446* (2013.01); *H04W 72/1242* (2013.01); *H04W 74/0833* (2013.01); *H04W 76/27* (2018.02); *H04W 80/02* (2013.01); *H04W 72/1284* (2013.01)

(56) References Cited

U.S. PATENT DOCUMENTS

| | | | |
|---|---|---|---|
| 2016/0044606 A1* | 2/2016 | Yin | H04W 52/146 |
| | | | 455/450 |
| 2016/0302235 A1* | 10/2016 | Hwang | H04W 74/0833 |
| 2017/0013565 A1* | 1/2017 | Pelletier | H04W 52/365 |
| 2018/0199334 A1* | 7/2018 | Ying | H04W 72/0413 |
| 2018/0295651 A1* | 10/2018 | Cao | H04W 72/042 |
| 2018/0310321 A1* | 10/2018 | Basu Mallick | H04W 72/085 |
| 2019/0261391 A1* | 8/2019 | Kundu | H04W 72/0446 |
| 2020/0112391 A1* | 4/2020 | Yang | H04L 5/0044 |

* cited by examiner

SYSTEMS AND METHODS FOR PHYSICAL RANDOM ACCESS CHANNEL TRANSMISSIONS

REFERENCE TO RELATED APPLICATIONS

This application claims the benefit of U.S. Provisional Application No. 62/654,006, filed Apr. 6, 2018 and U.S. Provisional Application No. 62/670,338, filed May 11, 2018, the contents of which are herein incorporated by reference in their entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

One of the resources used for communication is bandwidth. The bandwidth includes frequencies or ranges of frequencies used. Further, bandwidth is a limited resource and is typically in high demand.

The allocation or scheduling and use of bandwidth can be problematic. Insufficient bandwidth can degrade communications, such as by slowing data transfer. However, unused or underused bandwidth means that resources could be better used.

What are needed are techniques to facilitate the allocation, scheduling and use of bandwidth for wireless communication systems.

DETAILED DESCRIPTION

Figure 1:
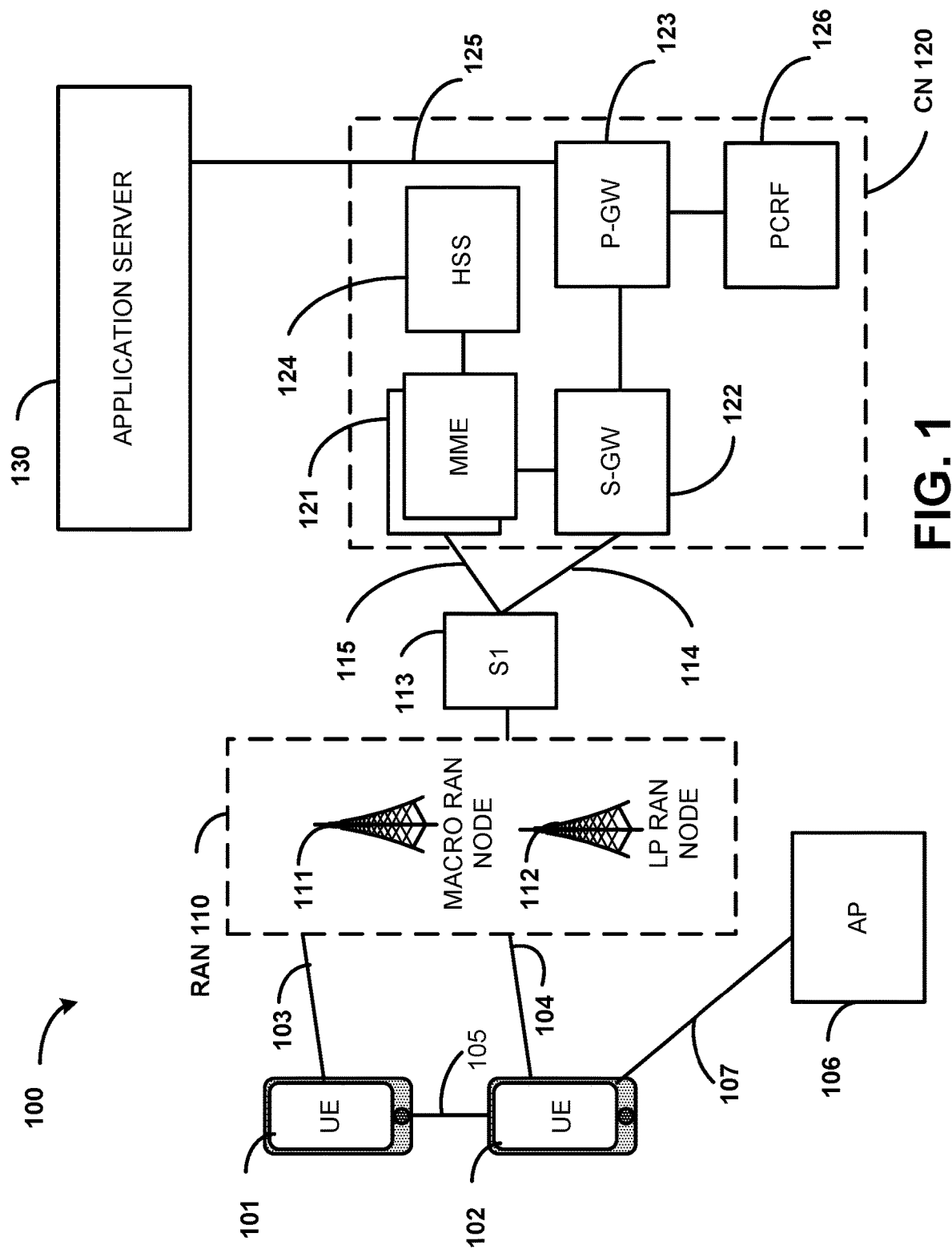
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1, RAN2, 5G and the like.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Mobile communication has evolved from early voice systems to highly sophisticated integrated communication systems or platforms. Next generation wireless/mobile communication systems, such as 5G and new radio (NR) are expected to be a unified network/system that targets to meet different and even conflicting performance dimensions and services. Such diverse multi-dimensional requirements are driven by different services and applications. Generally, NR will evolve based on 3GPP LTE-Advanced with additional potential new radio access. Further, NR is expected to evolve with additional potential new radio access technologies (RATs) to enrich mobile communication with improved, simple and seamless wireless connectivity solutions. NR can enable mobile communication that provides fast and rich contents and services.

It is appreciated that for a user equipment (UE) device to make a connection with a cell, the UE performs an initial access procedure. The initial access procedure or cell connection procedure includes obtaining synchronization, obtaining system information and a random access procedure.

For a handover situation, where the UE is moving from a current/source cell to a target cell, also receives or obtains PRACH configuration for the target cell. The UE can receive handover command message(s) from the current cell which include RACH configuration information of the target cell. The handover command message is also referred to as a reconfiguration with synch message. If the UE receives the SSB from the target cell, the UE can determine the frame boundary of the target cell, however it does not know the system frame number (SFN) information for the target cell until it receives the PBCH. The UE uses the SFN for RACH, however there is too much complexity for the UE to read the PBCH to obtain the SFN for handover purposes. Additionally, reading the PBCH by the UE also increases the handover delay.

Generally, the PRACH is provided for initial access to the network. The PRACH can also be utilized for During RRC connection re-establishment procedures, handover operations, when uplink synchronization is lost and the like.

It is also appreciated that user equipment (UE) devices may be required to perform a PRACH transmission and SR transmission in the same slot for a single cell to comply with various standards. However, the UE devices can comply with this specification or requirement in higher layers, such as the transport or application layers, while using different slots and the like at the physical layer.

One or more embodiments are disclosed that facilitate cell access and cell handovers. The embodiments include timing constraints that facilitate the cell initialization and/or handover processes. The timing constraints can be pre-defined and/or vary based on system parameters.

One or more embodiments are disclosed that facilitate UE devices with regard to PRACH and SR channels/transmissions. One or more standards can include specifications that cause PRACH and SR transmissions to occur within a single slot and/or the same slot. The embodiments utilize a prioritization rule in the physical layer to prioritize PRACH and SR channels/transmissions. The prioritization can allocate power and the like to the channel having the higher priority. Further, the channels can utilize different slots at the physical layer based on the prioritization while using the same slot at higher layers, such as the MAC layer.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
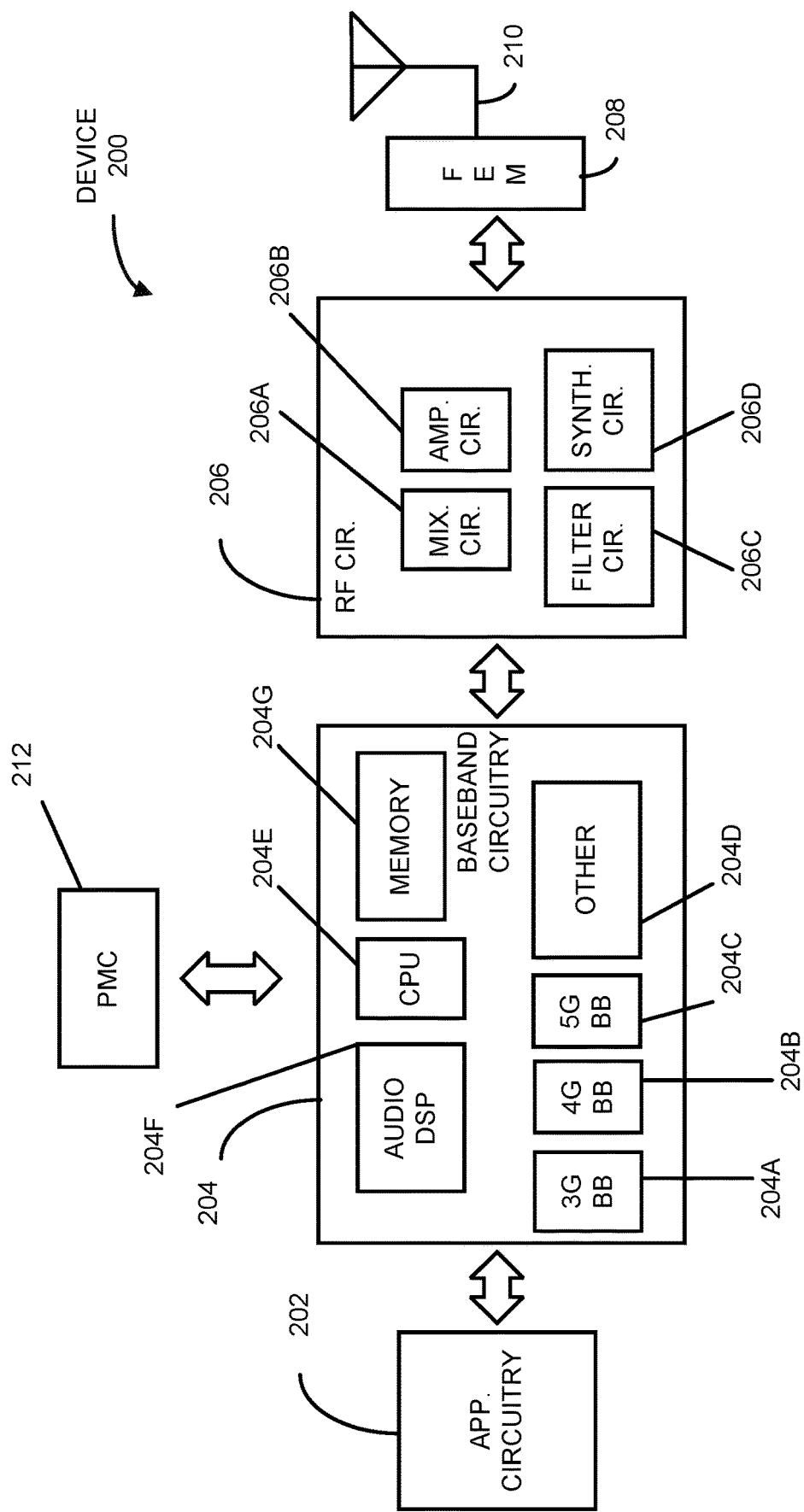
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node cannot utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
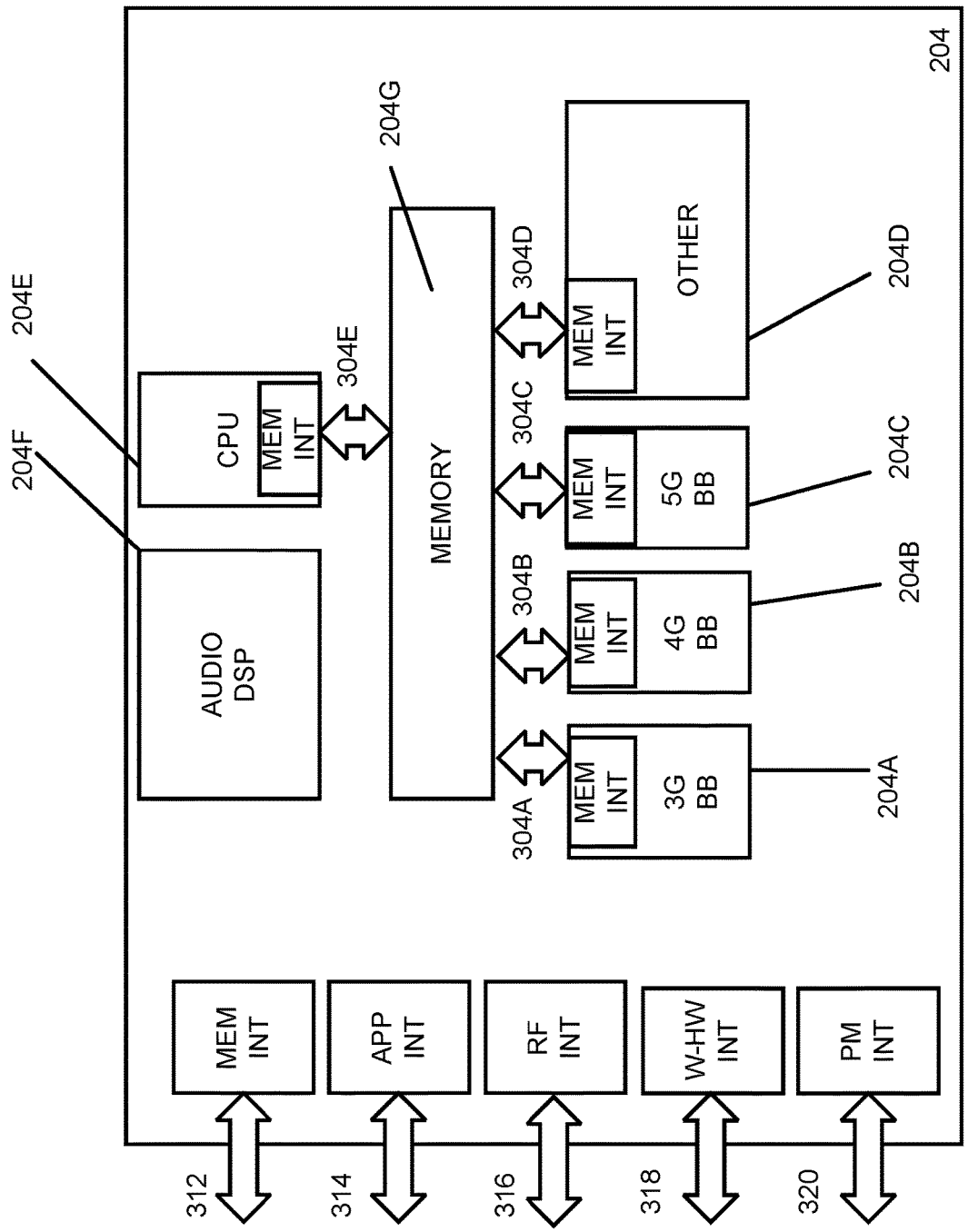
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
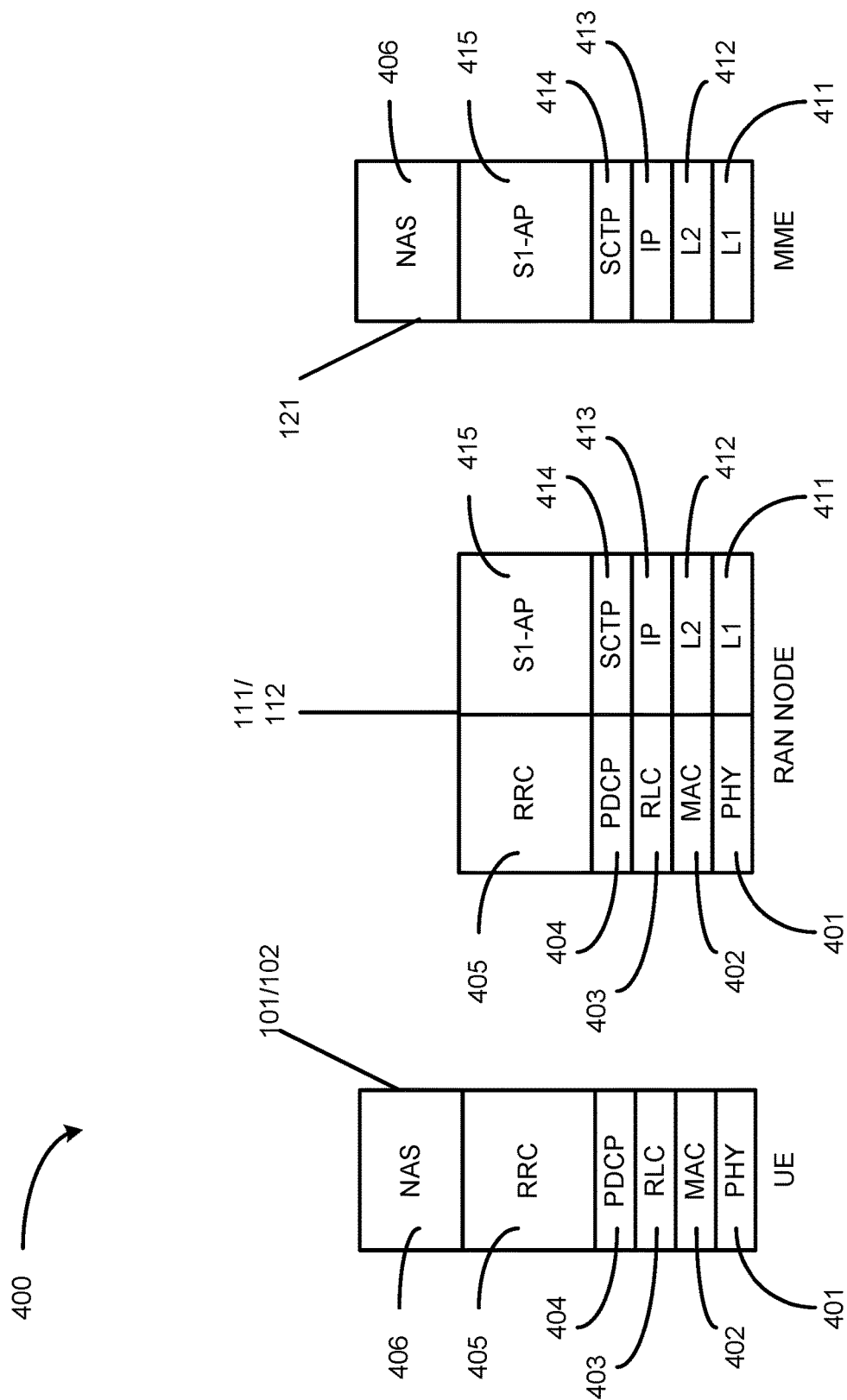
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
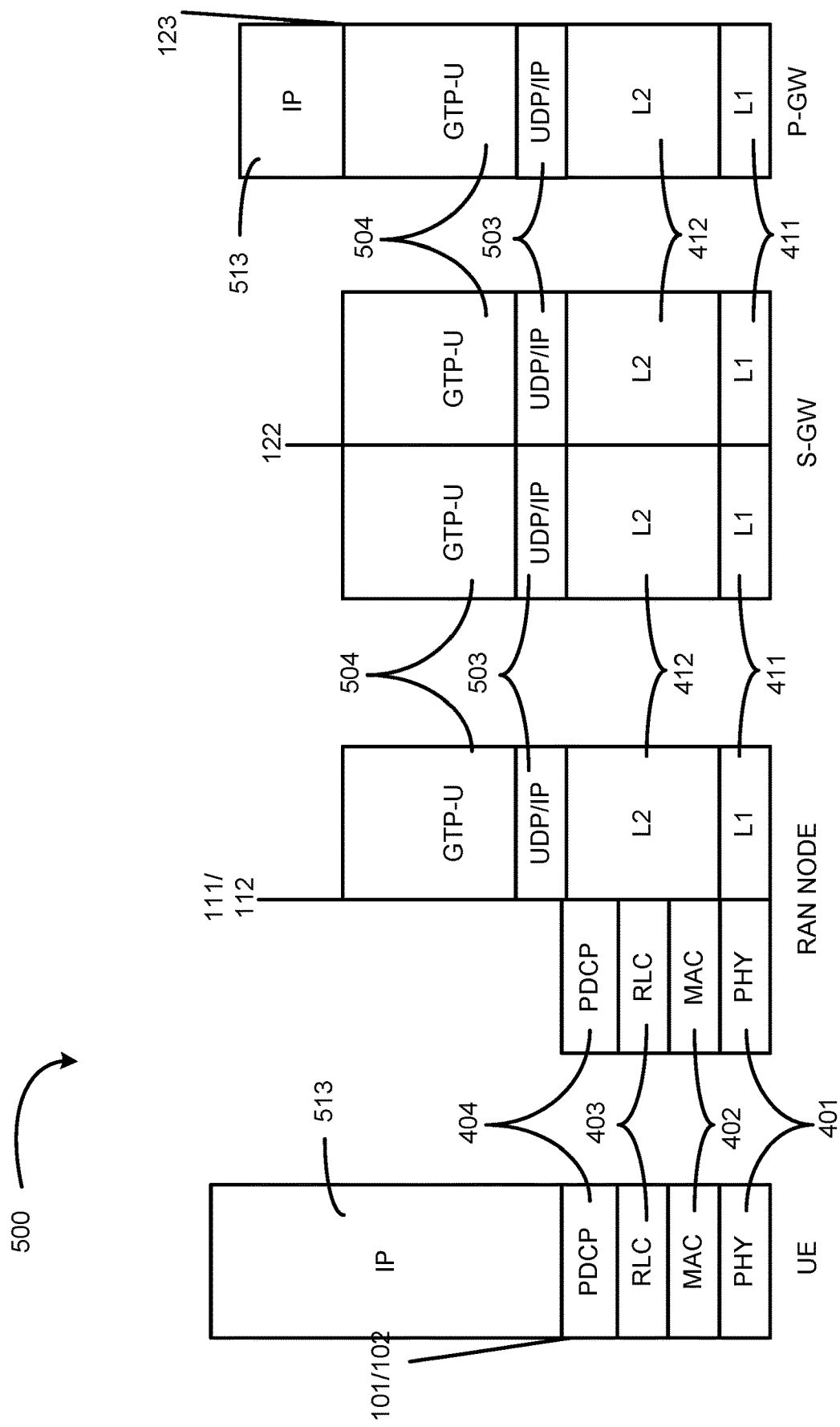
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
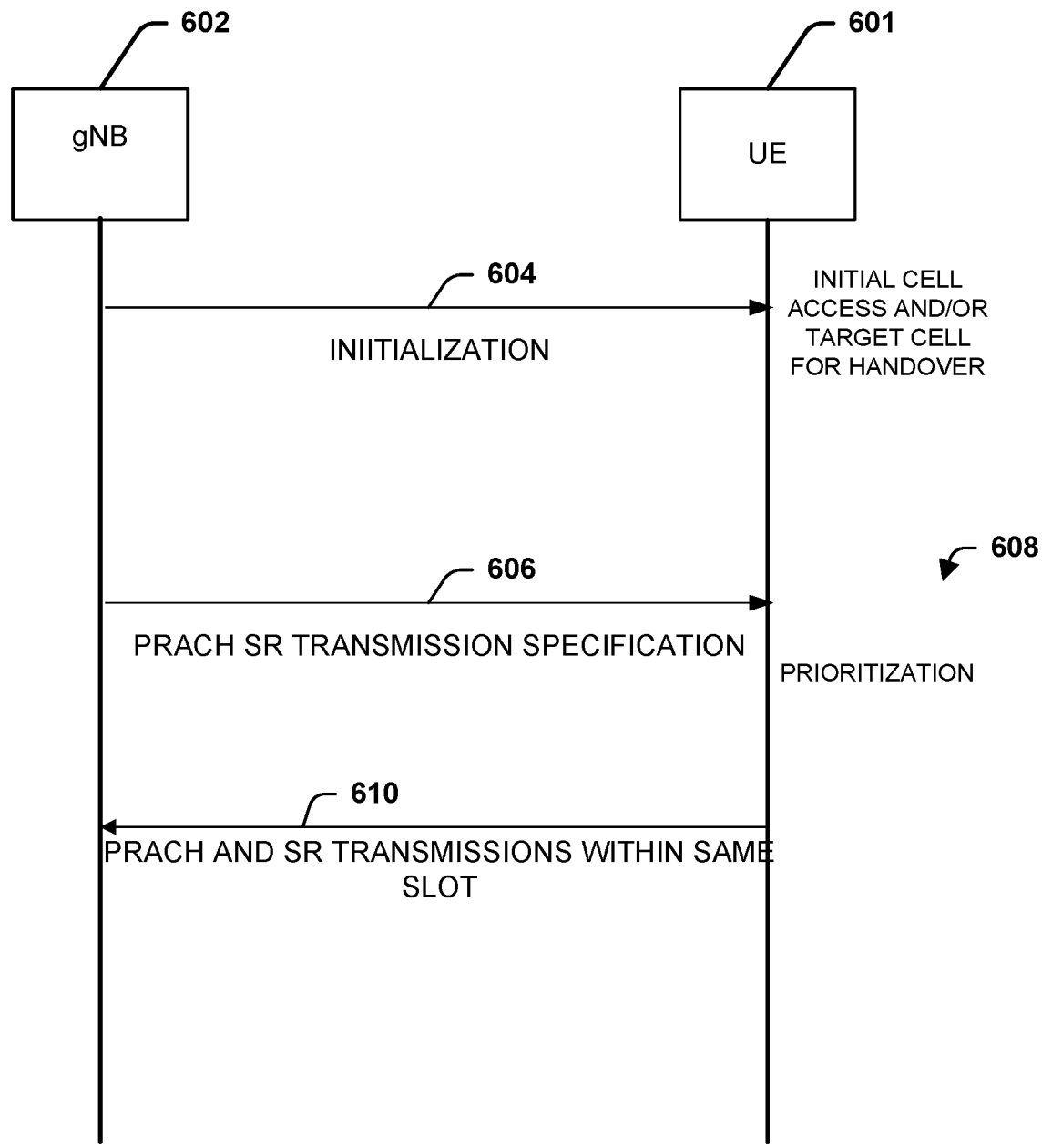
FIG. 6 is a diagram illustrating an architecture of a system that facilitates transmission of random access channels in accordance with one or more embodiments.

FIG. 6 is a diagram illustrating an architecture of a system 600 that facilitates transmission of random access channels in accordance with one or more embodiments. The system or apparatus 600 can be utilized with the above embodiments and variations thereof, including the system 100 described above. The system 600 is provided as an example and it is appreciated that suitable variations are contemplated.

The system 600 facilitates simultaneous transmissions of physical random access channels (PRACH) and scheduling requests (SR) within a single slot and/or the same slot in higher layers. The system 600 allows/facilitates the simultaneous transmission at higher layers, such as the MAC layer, while using varied slots in the physical (PHY) layer. The system 600 prioritizes the transmissions using PRACH priority rules.

The system 600 includes a network device 601 and a node 602. The device 601 is shown as a UE device and the node 602 is shown as gNB for illustrative purposes. It is appreciated that the UE device 601 can be other network devices, such as APs, ANs and the like. It is also appreciated that the gNB 602 can be other nodes or access nodes (ANs), such as a base station (BS), eNB, gNB, RAN nodes, UE and the like. Other network or network devices can be present and interact with the device 601 and/or the node 602. Operation of the device 601 and/or the node 602 can be performed by circuitry, such as the baseband circuitry 204, described above.

Generally, downlink (DL) transmissions occur from the gNB 602 to the UE 601 whereas uplink (UL) transmissions occur from the UE 601 to the gNB 602. The downlink transmissions typically utilize a DL control channel and a DL data channel. The uplink transmissions typically utilize an UL control channel and a UL data channel. The various channels can be different in terms of direction, link to another gNB, eNB and the like.

The UE 601 is one of a set or group of UE devices assigned to or associated with a cell of the gNB 602. The UE 601 can be configured with a secondary cell group (SCG) and/or a master cell group (MCG). Within a cell group, there can be a primary cell, secondary cell, serving cell and the like that belong with the group. The UE 601 can be associated or configured with one or more cell within the cell group.

The UE 601 can receive configurations and/or requirements for operation with the cell and the gNB 602 at 604. The configurations can also be pre-determined and/or provided another way.

Resources for the UE 601 can be allocated for UL and/or DL communications/transmissions.

One specification and/or requirement 606 is that the UE 601 is required to transmit PRACH and SR within the same slot.

The PRACH is a physical random access channel (PRACH) used by the UE 601 to request uplink allocations from the gNB 602.

The SR is a scheduling request (SR). This is a special Physical Layer message for UE 601 to ask a Network to send an UL Grant (DCI Format 0) so that UE 601 can transmit a physical uplink shared channel (PUSCH). The SR is an Uplink Physical Layer message from the UE 601 to Network requesting uplink resources to send data.

The UE 601 can send the SR on a PUCCH (or on UCI part on PUSCH), as an example.

The UE 601 determines a prioritization for the PRACH and SR transmissions at 608. The UE 601 also generates a PRACH transmission and an SR transmission.

The UE 601 sends the PRACH transmission and the SR transmission according to the determined prioritization at 610. The transmissions are within the same slot for higher layers, such as the application layer.

It is appreciated that the radio access network layer 2 (RAN2) allows the situation that PRACH and SR happens at the same slot. However, it can be problematic to have simultaneous transmission of PRACH and SR in the physical layer, such as radio access network layer 1 (RAN1). For example, a single carrier frequency-division multiple access scheme (SC-FDMA) does not support simultaneous transmission in the physical layer, RAN1. For situations where an OFDM waveform is used, the simultaneous transmission of PRACH and SR on PUCCH typically results in additional UE complexity and specification works including power control, beam related issue, and the like.

Thus, a PRACH prioritization rule is utilized to prioritize the PRACH and SR transmissions in the physical layer, RAN1. The prioritization permits and facilitates transmission of the PRACH and SR transmissions on different slots in the physical layer, but can be within the same slot for higher layers, such as RAN2. The prioritization rule can come into play when PRACH and SR happen from a higher layer, such as MAC, at the same slot. It is appreciated that when collisions happen, the channel or transmission with lower priority can be dropped.

The UE 601 can allocate power to the PRACH and SR for transmission and other channels/transmissions also using the prioritization rule. In one example, the UE 601 allocates power to the PRACH transmission and the SR transmission and other transmissions in descending order of a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

Some example scenarios are described below and provided as examples for illustrative purposes.

Scenario 1: A UE triggers a random access procedure due to no corresponding SR configuration for data of logical channel 1 (e.g., enhanced mobile broadband (eMBB)) and the UE triggers a scheduling request with a corresponding SR configuration for data of logical channel 2 (e.g., Ultra-reliable low latency communication (URLLC))

Scenario 2: A UE triggers a random access procedure for a beam failure recovery request and the UE triggers a scheduling request with a corresponding SR configuration for uplink data arrival.

Scenario 3: A UE triggers a random access procedure for system information request and the UE triggers a scheduling request with corresponding SR configuration for uplink data arrival For Scenario 1, the SR transmission is prioritized over the PRACH since the URLLC requires lower latency than eMBB. However, for Scenario 2, if the beam failure recovery is for both logical channels including eMBB and URLLC, then PRACH can be prioritized over SR. However, L1 (layer 1) does not have quality of service (QoS) information for each logical channel so it is not possible to apply the different prioritization rule depending on the properties of logical channels.

It is appreciated that there are three different options for the prioritization as shown below.

Prioritization 1: SR on PUCCH is prioritized over PRACH

Prioritization 2: PRACH is prioritized over SR on PUCCH

Prioritization 3: The network (NW) configures the prioritization rule between SR on PUCCH and PRACH A prioritization rule in the physical layer can be involved or used if PRACH and SR happen from a medium access control (MAC) layer at the same slot. The rule provides sufficient power to the channel (or transmission) having the higher priority and remaining power is assigned to the lower priority channel.

NR also includes a PRACH configuration of 20 ms for PRACH resource periodicity and even larger values in FR1 paired/unpaired spectrum cases and FR2 unpaired case. Here, if the UE performs PRACH for the handover, UE obtains or is provided the frame boundary to figure out the detailed resource for PRACH. However, with the PRACH configuration of 20 ms periodicity, the UE obtains or is provided with which frame is the frame where PRACH is transmitted. It is appreciated that the UE can detect the radio frame boundary or half radio frame boundary from the PSS/SSS, however the UE does not know the system frame number (SFN) before decoding the physical broadcast channel (PBCH). Thus, the UE is not aware of which radio frame the RACH can be transmitted if the PRACH resource periodicity is 20 ms by only detecting PSS/SSS.

In one example, a constraint of the relative timing between a current cell and a target cell for a handover operation is defined. By using this timing constraint, the UE is aware of the PRACH resource without decoding the PBCH of the target cell. However, based on an $L_{max}$ value (max number of synchronization signal (SS)/PBCH blocks (SSBs) within a set), the UE can know the frame boundary ($L_{max}=4$) or half-frame boundary ($L_{max}=8$ or $L_{max}=64$) before decoding of PBCH. Therefore, a different timing constraint has to be defined depending on $L_{max}$ value. Thus, the timing constraint depends on the $L_{max}$ value or number of SSBs.

In case of $L_{max}=4$, a half frame bit is included in the demodulation reference signal (DMRS) of the PBCH, so that the UE can determine the radio frame boundary before actual decoding of PBCH. However, in the cases of $L_{max}=8$ or $L_{max}=64$, the half frame bit is included in the PBCH, so that the UE can determine the half radio frame boundary before PBCH decoding. Therefore, if $L_{max}=4$, UE can use an absolute value of the relative time difference between radio frame i in the current cell and the target cell of less than $153600 \cdot T_S$ for handover purposes. Otherwise, the UE can use an absolute value of the relative time difference of less than $153600/2 \cdot T_S$.

In another example, a constraint of the relative timing between a current cell and a target cell is defined without regard to the $L_{max}$ value. Here, the UE uses an absolute value of the relative time difference of less than $153600/2 \cdot T_S$ for handover purposes.

Figure 7:
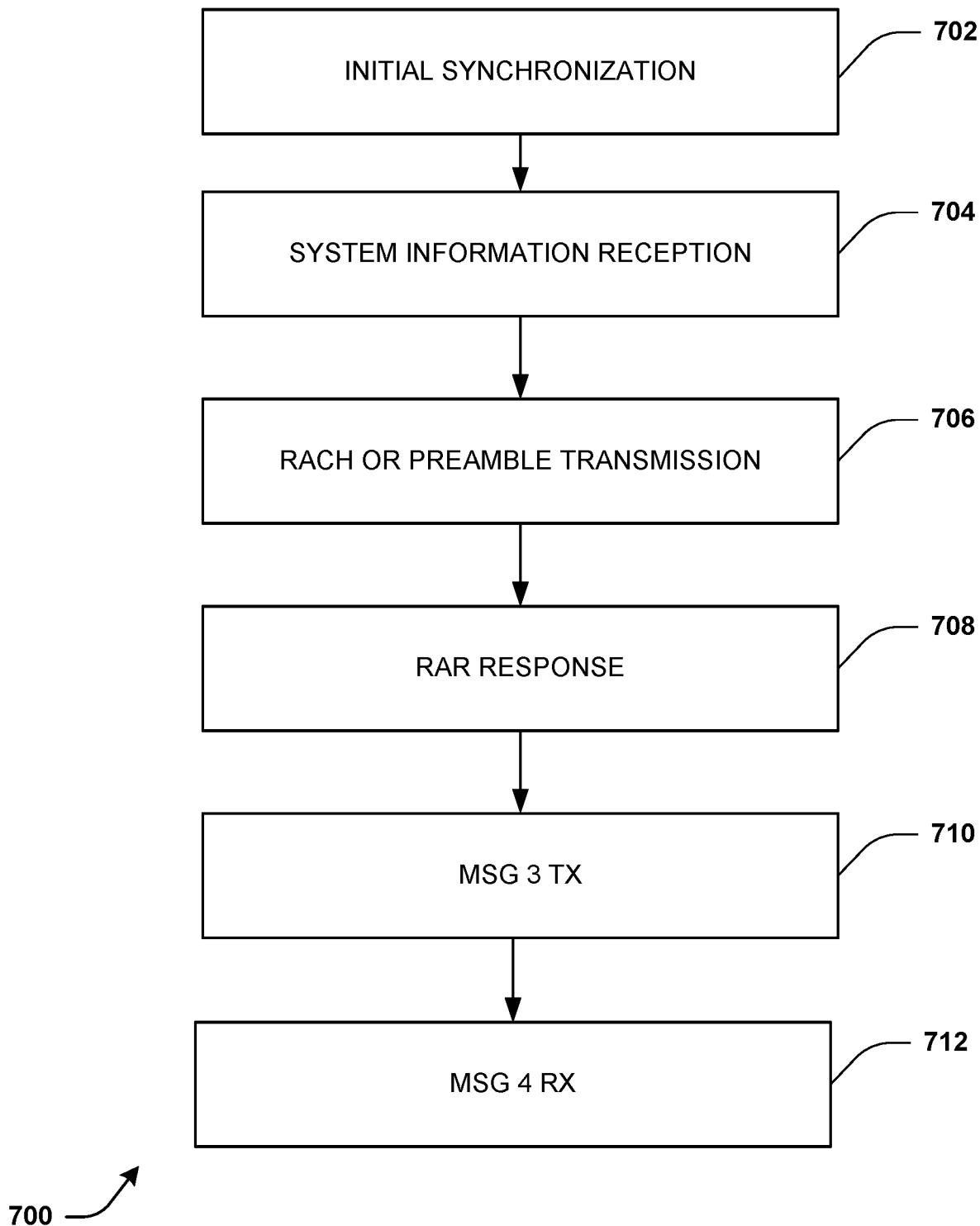
FIG. 7 is a diagram illustrating a process or method for an initial access procedure with a cell by a user equipment (UE) device in accordance with one or more embodiments.

FIG. 7 is a diagram illustrating a process or method 700 for an initial access procedure with a cell by a user equipment (UE) device in accordance with one or more embodiments. The method 700 is provided for illustrative purposes and it is appreciated that suitable variations are contemplated.

The UE device can be the UE 601 described above with regard to system 600.

When connecting to a cell, the UE generally performs an initial access procedure. The initial access procedure or cell connection procedure includes obtaining synchronization, obtaining system information and a random access procedure.

The method begins at block 702 where the UE performs an initial synchronization by detecting synchronization signals.

The UE obtains the sequentially obtains system information at block 704 by receiving a Physical Broadcast Channel (PBCH). The system information includes at least random access procedure configuration information.

The UE device performs a random access procedure using block 706, 708, 710 and 712.

The UE initially transmits PRACH (Msg-1) at block 706.

In response, the UE receives RACH response (RAR) (Msg-2). If no RAR is received by the UE within a selected time (pre-defined or configured) window, the UE retransmits the PRACH at 706 with a different power until it receives the RAR.

If the UE receives RAR, then it transmits Msg-3 at block 710. The UE decodes the content of the RAR and generates the radio resource control (RRC) connection request (the Msg-3). The UE can use a physical uplink shared channel (PUSCH) to send the RRC connection request.

In response, the UE receives the Msg-4 at block 712. The UE can monitor for the MPDCCH that is used to receive the Msg-4. The Msg-4 is typically carried by a PDSCH.

It is appreciated that the above description for FIG. 7 is provided as an example for illustrative purposes and that suitable variations are contemplated.

Figure 8:
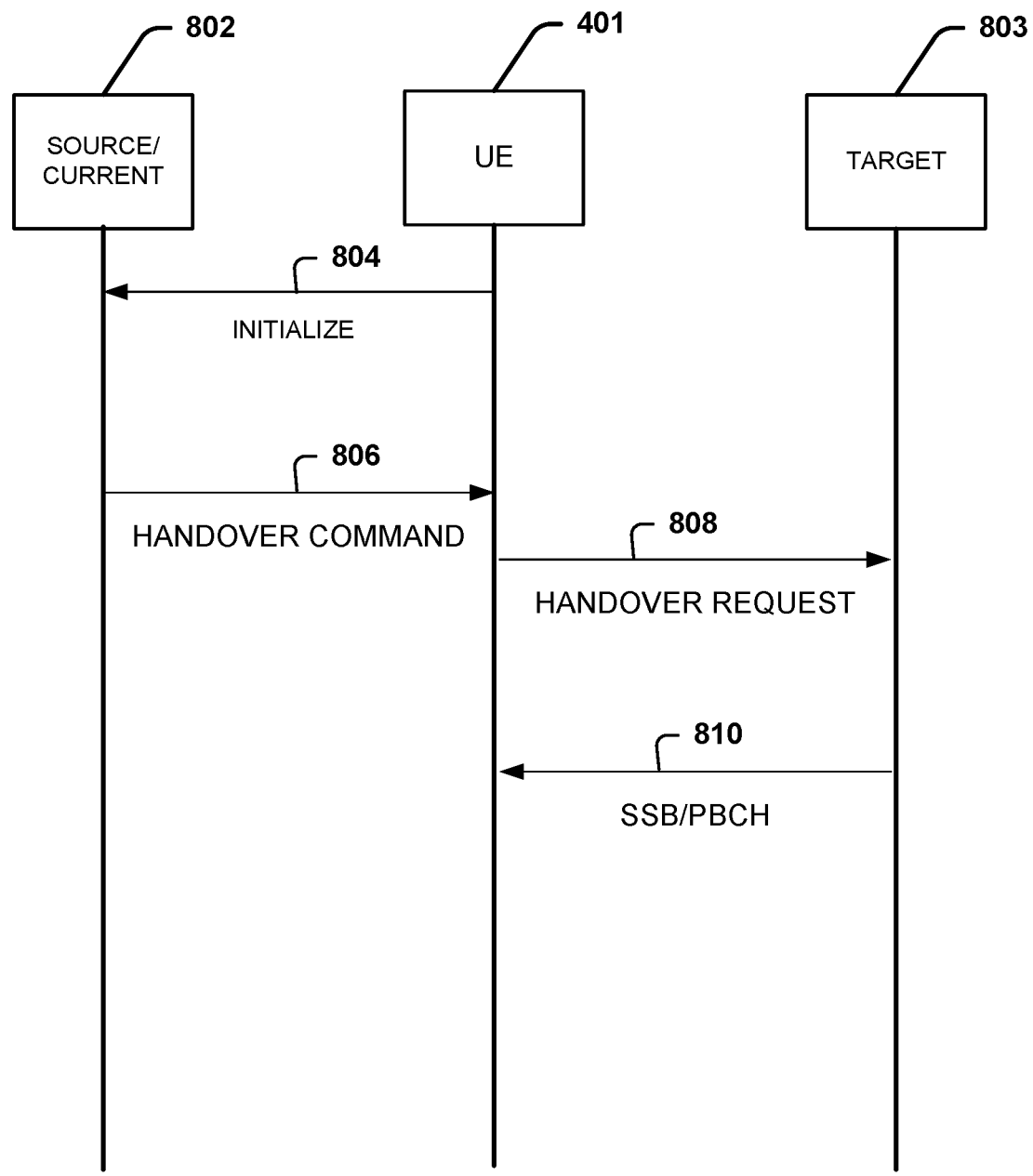
FIG. 8 is a diagram illustrating an architecture of a system that facilitates handover operations from a source cell to a target cell in accordance with one or more embodiments.

FIG. 8 is a diagram illustrating an architecture of a system 800 that facilitates handover operations from a source cell to a target cell in accordance with one or more embodiments. The system or apparatus 800 can be utilized with the above embodiments and variations thereof, including the system 100 described above. The system 800 is provided as an example and it is appreciated that suitable variations are contemplated.

The system 800 includes the UE device 601, a source/current cell or gNB 802 and a target cell or gNB 803. The UE device 601 can be the UE device 601 described above with regard to the system 600. The source cell 802 and the target 803 can include or utilize one or more gNBs, such as the gNB 602.

The UE 601 initializes access to the source cell 802 at 804 as shown. The UE 601 can utilize the initial access method 700 described above.

The source cell 802 sends a handover command to the UE at 806. The handover command indicates that the UE is to switch from the source cell to the target cell 803. The handover command message can also be referred to as "Reconfiguration with sync message".

The target cell 803 sends an SSB/PBCH at 808. The SSB/PBCH 808 includes PRACH configuration information. If the UE 601 receives the SSB from the target cell 803, the UE 601 can determine the frame boundary of the target cell 803 but it does not know the system frame number (SFN) information of the target cell 803 until it receives PBCH.

For RACH, it may be possible that the UE 601 can determine the SFN from the PBCH, however reading the PBCH to determine the SFN information is complex and can increase a handover delay.

In NR, RACH can be configured with a pre-defined periodicity and the periodicity can be one of 10/20/40/80/160 ms. When the RACH resource periodicity of the target cell 803 is configured as more than 10 ms, if the UE 601 transmits PRACH during handover, the UE needs to know the SFN of the target cell 803 to figure out the detailed resources for PRACH. Without reading the PBCH, it is not possible to know the SFN information of the target cell 803.

However, as stated above, reading the PBCH leads to an additional delay of the handover operation, can increase battery consumption and the like. Techniques are described below that allow transmission of PRACH by the UE 601 without reading the PBCH of the target cell 803 during the handover operation.

In one technique, a constraint of the relative timing between the current cell and the target cell is defined based on $L_{max}$. By using this timing constraint, the UE 601 can determine the PRACH resource without decoding the PBCH of the target cell 803. The PRACH resource is based on the frame boundary ($L_{max}$=4) or half-frame boundary ($L_{max}$=8 or $L_{max}$=64) before decoding of PBCH. Therefore, different timing constraints are used or defined depending on the $L_{max}$ value.

In addition to the RACH configuration period, the time period for SSB to RO association is considered since this time period is also determined based on the SFN. The UE 601 uses the SFN to determine mapping between the SSB and RO of the target cell. The SSB to RO mapping period is always larger than 10 ms if the RACH configuration period is larger than 10 ms. Even when the RACH configuration period is equal to 10 ms, it is possible that SSB to RO mapping period can be larger than 10 ms, which can also be the timing constraint.

There are generally two cases: ($L_{max}$=4) and ($L_{max}$=8 or $L_{max}$=64)

In the case of $L_{max}$=4, a half frame bit is included in the DMRS of PBCH. The UE 601 can determine or know the radio frame boundary before actual decoding of PBCH. Therefore, based on the RACH configuration period and SSB to RO mapping period, time constraint is needed or not.

If either RACH configuration period or SSB to RO mapping period is larger than 10 ms, the UE can assume an absolute value of the relative time difference between radio frame i in the current cell and the target cell of less than 153600·$T_S$.

However, in the case of $L_{max}$=8 or $L_{max}$=64, the half frame bit is included in the PBCH. The UE can determine or know the half radio frame boundary before PBCH decoding.

The UE can assume an absolute value of the relative time difference between radio frame i in the current cell and the target cell of less than 153600/2·$T_S$.

In another example, for the case that the UE needs SFN information of the target cell 803, the source cell 801 provides SFN offset information along with the handover command message. The SFN offset is the relative SFN offset between source cell and target cell.

Even though the SFN offset is signaled via handover command message, there can be timing uncertainty depending on the UE position or timing drift in network side. Therefore, we also need the certain timing constraint like the following.

In case of $L_{max}$=4, if either RACH configuration period or SSB to RO mapping period is larger than 10 ms, than UE 601 can assume an absolute value of the relative time difference between radio frame boundaries of the current cell 801 and the target cell 803 of less than 153600·$T_S$.

However, in case of $L_{max}$=8 or $L_{max}$=64, the half frame bit is included in the PBCH, where UE 601 can determine or know the half radio frame boundary before PBCH decoding. The UE can assume an absolute value of the relative time difference between radio frame boundaries of the current cell and the target cell of less than 153600/2·$T_S$.

In accordance with another technique, the source cell 802 provides SFN offset information along with the handover command message to the UE 601. The SFN offset is relative between the source cell 802 and the target cell 803.

Even though SFN offset is signaled via handover command message, there can be timing uncertainty depending on the UE position or timing drift in network side. To mitigate this potential uncertainty, additional information (referred to as SFN offset additional information) can be included in the handover command message. One example of the additional information is an SFN offset uncertainty. In this example, the SFN offset uncertainty is negative or non-negative using 1 bit of information (SFN timing adjustment bit). It is appreciated that other SFN offset additional information is contemplated.

In another example, where the target cell uses an $L_{max}$ of 4, the time constraint is an absolute value of a time difference between a radio frame in the source cell and a radio frame in the target cell is less than 153600$T_S$ if an associated pattern period is not equal to 10 ms.

In yet another example, where the source cell is either in paired or unpaired spectrum and the target cell is in unpaired spectrum, the target cell uses an $L_{max}$ of 8, the timing constraint is an absolute value of a time difference between a radio frame in the source cell and a radio frame in the target cell is less than 76800$T_S$.

It is appreciated that other suitable variations on the timing constraint and/or determining the SFN are contemplated.

Figure 9:
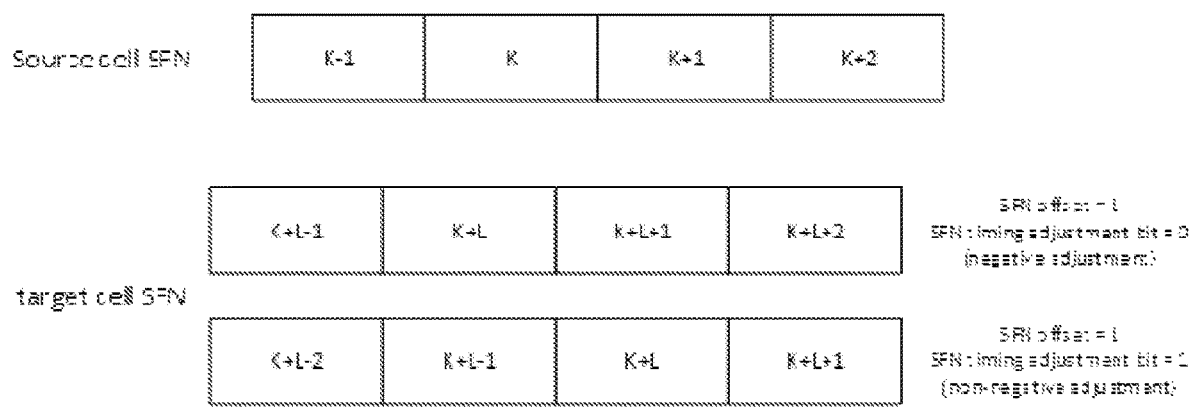
FIG. 9 is a diagram illustrating an example of SFN offset additional information in accordance with one or more embodiments.

FIG. 9 is a diagram illustrating an example of SFN offset additional information in accordance with one or more embodiments. The example is provided for illustrative purposes and it is appreciated that suitable variations are contemplated.

In this example, the additional information comprises an SFN offset uncertainty, also referred to as an SFN timing adjustment bit. The SFN offset uncertainty is a single bit of information that represents negative or non-negative.

In this example, the system frame number (SFN) for a source cell is shown as K−1, K, K+1, K+2, . . . . The SFN offset is represented by L and is provided with the handover message. The SFN timing adjustment bit is shown for both values, '0' and '1'.

In this example, if the SFN timing adjustment bit is '0', it is a negative adjustment. Thus, the SFN for a target cell is shown as K+L−1, K+L, K+L+1, K+L+2, . . . .

If the SFN timing adjustment bit is '1', it is a non-negative adjustment. Thus, the SFN for the target cell is shown as K+L−2, K+L−1, K+L, K+L+1, . . . .

Thus, the SFN value of the target cell is determined according to the source cell SFN, the SFN offset and the SFN offset additional information.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for a user equipment (UE) device. The apparatus comprises baseband circuitry and/or application circuitry which includes a radio frequency (RF) interface and one or more processors. The one or more processors are configured to generate a physical random access channel (PRACH) and a medium access control (MAC) layer within a slot, determine a PRACH prioritization and an SR prioritization at a physical layer according to a prioritization rule; and provide the PRACH and the SR to the RF interface for transmission according to the prioritization rule.

Example 2 includes the subject matter of Example 1, including or omitting optional elements, wherein the one or more processors are configured wherein the one or more processors are configured to allocate power to the PRACH and the SR based on the prioritization rule.

Example 3 includes the subject matter of any of Examples 1-2, including or omitting optional elements, wherein the one or more processors are configured to allocate power in descending order of: a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

Example 4 includes the subject matter of any of Examples 1-3, including or omitting optional elements, wherein the one or more processors are configured to allocate physical layer slots to the PRACH and SR in descending priority of: a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

Example 5 includes the subject matter of any of Examples 1-4, including or omitting optional elements, wherein the one or more processors are configured to determine a higher priority channel and a lower priority channel of the PRACH and the SR and provide the higher priority channel in a first physical slot and provide the lower priority channel in a second physical slot, where the second physical slot is later than the first physical slot.

Example 6 includes the subject matter of any of Examples 1-5, including or omitting optional elements, wherein the prioritization rule is provided by a network (NW).

Example 7 includes the subject matter of any of Examples 1-6, including or omitting optional elements, wherein the prioritization rule is based on a logical channel type and/or beam recovery.

Example 8 includes the subject matter of any of Examples 1-7, including or omitting optional elements, wherein the logical channel type is enhanced mobile broadband (eMBB) or ultra-reliable low latency communication (URLLC).

Example 9 includes the subject matter of any of Examples 1-8, including or omitting optional elements, wherein the prioritization rule is based on latency characteristics associated with the SR and PRACH.

Example 10 includes the subject matter of any of Examples 1-9, including or omitting optional elements, wherein the prioritization rule sets the SR prioritization higher than the PRACH prioritization upon the SR being on a physical uplink control channel (PUCCH).

Example 11 includes the subject matter of any of Examples 1-10, including or omitting optional elements, wherein the prioritization rule sets the PRACH prioritization higher than the SR prioritization upon the SR being on a physical uplink control channel (PUCCH).

Example 12 includes the subject matter of any of Examples 1-11, including or omitting optional elements, further comprising a next Generation NodeB (gNB) configured to receive the SR and the PRACH on different physical slots and on the same MAC layer slot.

Example 13 is an apparatus for a user equipment (UE) device, comprising baseband circuitry having a radio frequency (RF) interface and one or more processors. The radio frequency (RF) interface is configured to receive a radio resource management (RRM) measurement configuration. The one or more processors are configured to receive a handover command message from a source cell; determine a system frame number (SFN) for a target cell based on a timing constraint; generate a physical random access channel (PRACH) for a target cell using the SFN; and provide the PRACH to the RF interface for transmission to the target cell.

Example 14 includes the subject matter of Example 13, including or omitting optional elements, wherein when the target cell uses an $L_{max}$ of 4, the timing constraint is an absolute value of a time difference between a radio frame in the source cell and a radio frame in the target cell is less than $153600T_S$ if an associated pattern period is not equal to 10 ms.

Example 15 includes the subject matter of any of Examples 13-14, including or omitting optional elements, wherein the source cell is either in paired or unpaired spectrum and the target cell is in unpaired spectrum the target cell uses an $L_{max}$ of 8, the timing constraint is an absolute value of a time difference between a radio frame in the source cell and a radio frame in the target cell is less than $76800T_S$.

Example 16 includes the subject matter of any of Examples 13-15, including or omitting optional elements, wherein the one or more processors are configured to receive a random access channel (RACH) response from the target cell via the RF interface and generate a radio resource control (RRC) connection request.

Example 17 includes the subject matter of any of Examples 13-16, including or omitting optional elements, wherein the timing constraint is based on a number of SS/PBCH blocks (SSBs).

Example 18 includes the subject matter of any of Examples 13-17, including or omitting optional elements, wherein the timing constraint is based on a frame boundary or a half frame boundary.

Example 19 includes the subject matter of any of Examples 13-18, including or omitting optional elements, wherein the timing constraint is determined depends on maximum number of SSBs.

Example 20 includes the subject matter of any of Examples 13-19, including or omitting optional elements, wherein the timing constraint is determined depends on carrier frequency.

Example 21 includes the subject matter of any of Examples 13-20, including or omitting optional elements, wherein the handover message command from the source cell includes SFN information of the target cell and the one or more processors are configured to determine the timing constraint based on the SFN information.

Example 22 includes the subject matter of any of Examples 13-21, including or omitting optional elements, wherein the handover message command from the source cell includes SFN information and an SFN timing adjustment bit of the target cell and the one or more processors are configured to determine the timing constraint based on the SFN information and the SFN timing adjustment bit.

Example 23 includes the subject matter of any of Examples 13-22, including or omitting optional elements, wherein the timing constraint is based on RACH-SSB mapping periodicity.

Example 24 includes the subject matter of any of Examples 13-23, including or omitting optional elements, wherein the one or more processors are configured to determine the SFN of the target cell without decoding a physical broadcast channel (PBCH) of the target cell.

Example 25 is one or more computer-readable media having instructions that, when executed, cause a user equipment (UE) device to receive a physical random access channel (PRACH) and a scheduling request (SR) within a single slot of a higher layer, wherein the higher layer is higher than a physical layer; determine a prioritization rule for the PRACH and the SR; and allocate transmission power to PRACH and the SR transmissions based on the prioritization rule.

Example 26 includes the subject matter of Example 25, including or omitting optional elements, wherein the instructions, when executed, cause the UE device to allocate power to the PRACH transmission and the SR transmission in descending order of a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

Example 27 includes the subject matter of any of Examples 25-26, including or omitting optional elements, wherein the instructions, when executed, cause the UE device to allocate slots to the PRACH transmission and the SR transmission in descending order of a PRACH transmission on a primary cell (PCell), a PUCCH transmission with HARQ-ACK information and/or SR or PUSCH transmission with HARQ-ACK information, a PUCCH transmission with CSI or PUSCH transmission with CSI, a PUSCH transmission without HARQ-ACK information or CSI.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE) device, comprising baseband circuitry having:
    a radio frequency (RF) interface; and
    one or more processors configured to:
        generate a physical random access channel (PRACH) and a scheduling request (SR) within a slot for a medium access control (MAC) layer;
        determine a PRACH prioritization and an SR prioritization at a physical layer according to a prioritization rule, wherein the prioritization rule is based on a logical channel type and/or beam recovery; and
        provide the PRACH and the SR to the RF interface for transmission according to the prioritization rule.

2. The apparatus of claim 1, wherein the one or more processors are configured to allocate power to the PRACH and the SR based on the prioritization rule.

3. The apparatus of claim 1, wherein the one or more processors are configured to allocate power in descending order of: a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

4. The apparatus of claim 1, wherein the one or more processors are configured to allocate physical layer slots to the PRACH and SR in descending priority of: a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

5. The apparatus of claim 1, wherein the one or more processors are configured to determine a higher priority channel and a lower priority channel of the PRACH and the SR and provide the higher priority channel in a first physical slot and provide the lower priority channel in a second physical slot, where the second physical slot is later than the first physical slot.

6. The apparatus of claim 1, wherein the prioritization rule is provided by a network (NW).

7. The apparatus of claim 1, wherein the logical channel type is enhanced mobile broadband (eMBB) or ultra-reliable low latency communication (URLLC).

8. The apparatus of claim 1, wherein the prioritization rule is based on latency characteristics associated with the SR and PRACH.

9. The apparatus of claim 1, wherein the prioritization rule sets the SR prioritization higher than the PRACH prioritization upon the SR being on a physical uplink control channel (PUCCH).

10. The apparatus of claim 1, wherein the prioritization rule sets the PRACH prioritization higher than the SR prioritization upon the SR being on a physical uplink control channel (PUCCH).

11. The apparatus of claim 1, further comprising a next Generation NodeB (gNB) configured to receive the SR and the PRACH on different physical slots and on the same MAC layer slot.

12. One or more non-transitory computer-readable media having instructions that, when executed, cause a user equipment (UE) device to:
    receive a physical random access channel (PRACH) and a scheduling request (SR) within a single slot of a higher layer, wherein the higher layer is higher than a physical layer;
    determine a prioritization rule for the PRACH and the SR, wherein the prioritization rule is based on a logical channel type and/or beam recovery; and
    allocate transmission power to PRACH and the SR transmissions based on the prioritization rule.

13. The non-transitory computer-readable media of claim 12, wherein the instructions, when executed, cause the UE device to allocate power to the PRACH transmission and the SR transmission in descending order of a PRACH transmission on a primary cell (PCell), a physical uplink control channel (PUCCH) transmission with hybrid automatic repeat request-acknowledge (HARQ-ACK) information and/or SR or physical uplink shared channel (PUSCH) transmission with HARQ-ACK information, a PUCCH transmission with channel state information (CSI) or PUSCH transmission with CSI, a PUSCH transmission without HARQ-ACK information or CSI.

14. The non-transitory computer-readable media of claim 12, wherein the instructions, when executed, cause the UE device to allocate slots to the PRACH transmission and the SR transmission in descending order of a PRACH transmission on a primary cell (PCell), a physical uplink control channel (PUCCH) transmission with HARQ-ACK information and/or SR or PUSCH transmission with HARQ-ACK information, a PUCCH transmission with CSI or PUSCH transmission with CSI, a PUSCH transmission without HARQ-ACK information or CSI.

\* \* \* \* \*